United States Patent
Creasey et al.

(10) Patent No.: US 9,052,714 B2
(45) Date of Patent: Jun. 9, 2015

(54) COMPUTER-IMPLEMENTED METHOD AND SYSTEM FOR CONTROLLING OPERATION OF AN AUTONOMOUS DRIVERLESS VEHICLE IN RESPONSE TO OBSTACLE DETECTION

(71) Applicant: Jaybridge Robotics, Inc., Cambridge, MA (US)

(72) Inventors: Samson F. Creasey, Cambridge, MA (US); Oliver P. Hinds, Cambridge, MA (US)

(73) Assignee: Jaybridge Robotics, Inc., Cambridge, MA (US)

(*) Notice: Subject to any disclaimer, the term of this patent is extended or adjusted under 35 U.S.C. 154(b) by 0 days.

(21) Appl. No.: 13/940,807

(22) Filed: Jul. 12, 2013

(65) Prior Publication Data

US 2015/0019043 A1   Jan. 15, 2015

(51) Int. Cl.
*G05D 1/00* (2006.01)

(52) U.S. Cl.
CPC ................................. *G05D 1/0038* (2013.01)

(58) Field of Classification Search
USPC ................ 701/1–2, 23–26, 28, 400; 348/148; 340/435–436, 500
See application file for complete search history.

(56) References Cited

U.S. PATENT DOCUMENTS

| | | | |
|---|---|---|---|
| 5,598,164 A | 1/1997 | Reppas et al. | |
| 6,109,568 A | 8/2000 | Gilbert et al. | |
| 6,804,607 B1 | 10/2004 | Wood | |
| 6,879,249 B2 | 4/2005 | Takahashi | |
| 7,539,557 B2 | 5/2009 | Yamauchi | |
| 7,741,961 B1 | 6/2010 | Rafii et al. | |
| 8,010,230 B2 | 8/2011 | Zini et al. | |
| 2005/0271037 A1 | 12/2005 | Habaguchi et al. | |
| 2008/0027599 A1* | 1/2008 | Logan et al. | 701/23 |
| 2008/0238643 A1 | 10/2008 | Malen | |
| 2008/0304705 A1* | 12/2008 | Pomerleau et al. | 382/103 |
| 2010/0070128 A1 | 3/2010 | Johnson | |
| 2010/0094481 A1* | 4/2010 | Anderson | 701/1 |
| 2011/0106339 A1* | 5/2011 | Phillips et al. | 701/2 |
| 2011/0215915 A1 | 9/2011 | Lee et al. | |
| 2012/0007117 A1 | 1/2012 | Andrews | |
| 2012/0083964 A1 | 4/2012 | Montemerlo et al. | |
| 2012/0239224 A1* | 9/2012 | McCabe et al. | 701/2 |
| 2013/0110368 A1 | 5/2013 | Zagorski | |
| 2013/0120158 A1 | 5/2013 | Tombley et al. | |

OTHER PUBLICATIONS

International Search Report and Written Opinion for PCT/US2014/045011, dated Oct. 27, 2014.

* cited by examiner

*Primary Examiner* — Yonel Beaulieu
(74) *Attorney, Agent, or Firm* — Rajesh Vallabh; Foley Hoag LLP

(57) ABSTRACT

A computer-implemented method and system for controlling operation of an autonomous driverless vehicle in response to detection of a hazard in the path of the vehicle.

30 Claims, 4 Drawing Sheets

Hazard polygons remaining after applying the region-to-ignore

Original hazard polygons

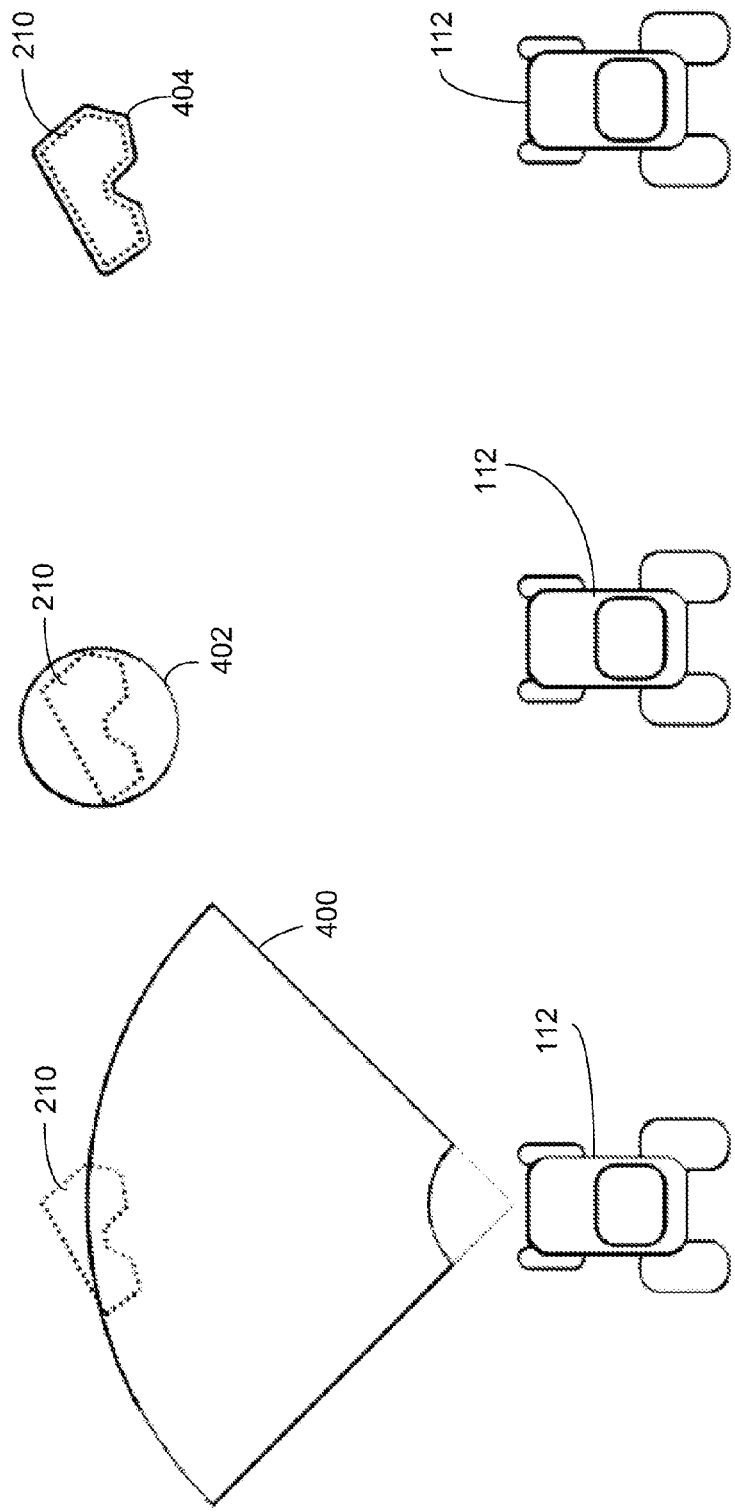

COMPUTER-IMPLEMENTED METHOD AND SYSTEM FOR CONTROLLING OPERATION OF AN AUTONOMOUS DRIVERLESS VEHICLE IN RESPONSE TO OBSTACLE DETECTION

BACKGROUND

The present application generally relates to autonomous driverless vehicles and, more particularly, to a computer-implemented methods and systems for controlling operation of such vehicles upon detection of hazards.

Autonomous vehicles operating in unconstrained or lightly constrained environments are typically outfitted with systems that detect obstacles or other environmental hazards in the vicinity of the vehicle. Such hazards may include, e.g., the unexpected presence of a human, animal, or another vehicle. When such a hazard is detected, the autonomous vehicle will alter its behavior to avoid the hazard, either changing course or halting its movement altogether.

Such safety sensing systems are imperfect, sometimes failing to detect hazards (a false negative event) or signaling a hazard that does not actually exist (a false positive event). The present application is directed to methods and systems for mitigating the impact of false positive events. The methods and systems enable a remote operator to assess whether or not a safety event is a false positive event and, if so, to command the vehicle to ignore it and continue its operation.

BRIEF SUMMARY OF THE DISCLOSURE

In accordance with one or more embodiments, a computer-implemented method is disclosed for controlling operation of an autonomous driverless vehicle in response to detection of a hazard in a path of the vehicle. The method is performed by a vehicle control system in the vehicle, and comprises the steps of: (a) detecting presence of a hazard in the path of the vehicle using an obstacle detection system in the vehicle; (b) transmitting a hazard alert message to a computer system operated by a human operator; and (c) receiving a command from the computer system operated by the human operator responsive to the hazard alert message, and operating the vehicle in accordance with said command.

In accordance with one or more further embodiments, a computer system in an autonomous driverless vehicle is disclosed, comprising: at least one processor; memory associated with the at least one processor; and a program supported in the memory for controlling operation of the vehicle in response to detection of a hazard in a path of the vehicle. The program includes a plurality of instructions stored therein which, when executed by the at least one processor, cause the at least one processor to: (a) detect the presence of a hazard in the path of the vehicle using an obstacle detection system in the vehicle; (b) transmit a hazard alert message to a computer system operated by a human operator; and (c) receive a command from the computer system operated by the human operator responsive to the hazard alert message, and operate the vehicle in accordance with said command.

In accordance with one or more further embodiments, a system is provided for controlling operation of an autonomous driverless vehicle in response to detection of a hazard in a path of the vehicle. The system comprises a computer system operated by a human operator and a vehicle controller located in the autonomous driverless vehicle. The vehicle controller is programmed to (a) detect the presence of a hazard in the path of the vehicle using an obstacle detection system in the vehicle; (b) transmit a hazard alert message to the computer system operated by a human operator; and (c) receive a command from the computer system operated by the human operator responsive to the hazard alert message, and operate the vehicle in accordance with said command.

BRIEF DESCRIPTION OF THE DRAWINGS

FIGS. 4A-4C are simplified diagrams illustrating processes for calculating a region-to-ignore in accordance with one or more embodiments.

DETAILED DESCRIPTION

The present application relates to automated detection of hazards by an autonomous, driverless vehicle. As discussed in further detail below, various embodiments disclosed herein are directed to manually suppressing the automatic response of the vehicle to detection of obstacles that do not present a hazard to the safe operation of the vehicle. A remote operator console provides an override control to a human operator, and communicates with a control module on the vehicle that inter-operates with collision-avoidance and other safety modules on the vehicle.

Figure 1:
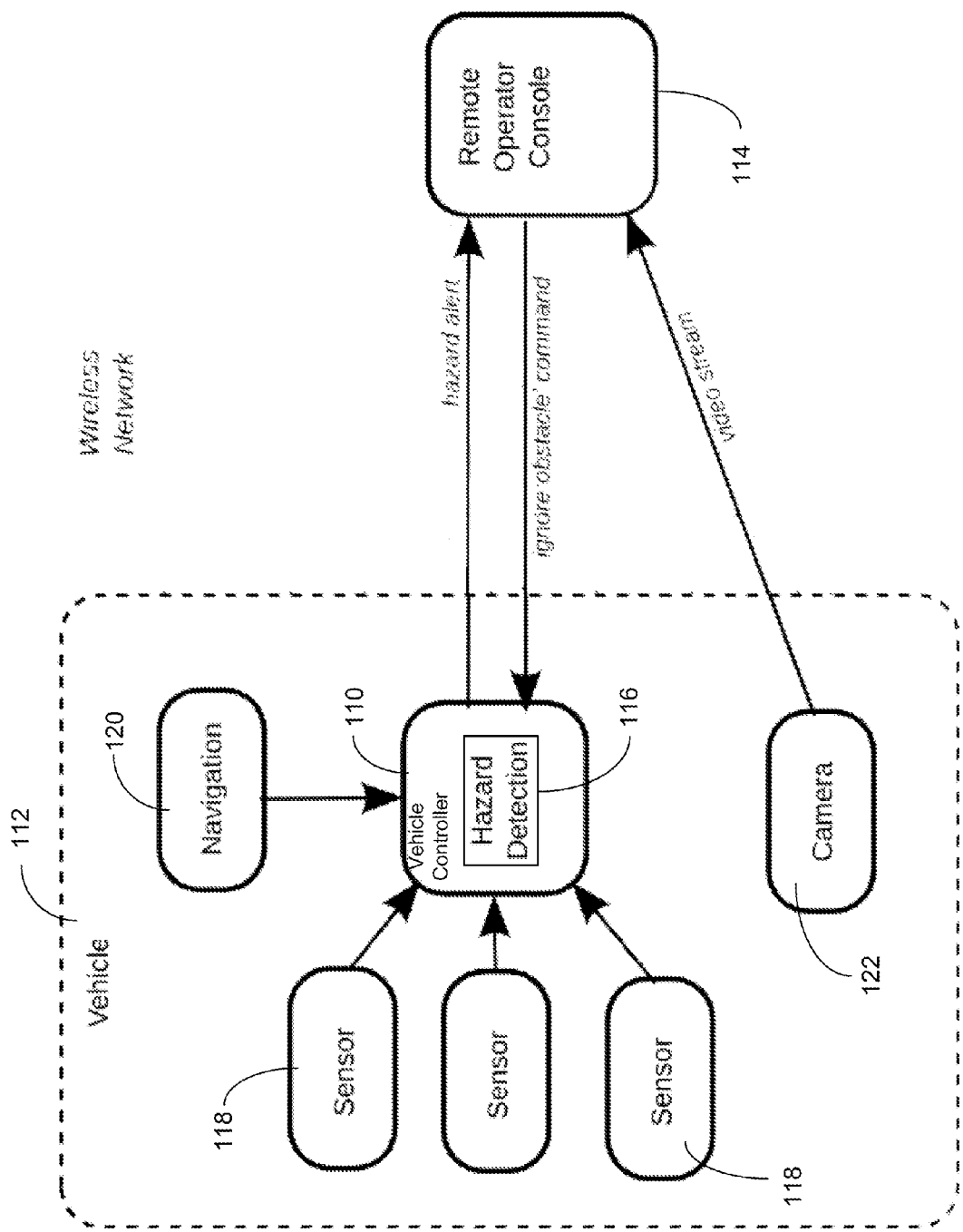
FIG. 1 is a simplified block diagram illustrating a system for controlling operation of an autonomous driverless vehicle in accordance with one or more embodiments.

FIG. 1 illustrates an exemplary system for controlling vehicle operation in response to detection of obstacles in accordance with one or more embodiments. As shown in FIG. 1, the system resides on two distinct physical components, the vehicle controller (VC) 110 and a remote operator console (ROC 114), which are connected by a wireless computer network. Examples of suitable wireless networks include, but are not limited to, Wi-Fi, WiMAX, and GPRS (General Packet Radio Service).

The VC 110 and the ROC 114 each comprise a programmable computer system including at least one processor and a storage medium readable by the processor. The ROC 114 includes a display interface and input devices such as, e.g., a mouse or keyboard for use by the operator.

The VC 110, which is located in the driverless vehicle, contains a hazard-detection module (HDM 116), which processes information from sensors 118 and navigation systems 120 in the vehicle in order to determine the presence and location, respectively, of hazards that affect the operation of the vehicle.

The sensors 118 for detecting obstacles can comprise a variety of sensors including, e.g., LIDAR (Light Detection and Ranging or Laser Imaging Detection and Ranging), RADAR (RAdio Detection And Ranging), SONAR (SOund Navigation And Ranging), and video cameras. The navigation system 120 can comprise any system capable of determining the geographic position and orientation of the vehicle including, e.g., a GPS (Global Positioning System) and AHRS (Attitude and Heading Reference System), which could be based on gyroscopes or accelerometers.

In one or more embodiments, hazards detected by the HDM 116 are represented as polygons with absolute geographic coordinates, i.e., polygons in which each vertex denotes a fixed position on the earth. In accordance with various embodiments, additional functionality is provided in the HDM 116 that enables manual suppression of obstacle detection.

When the HDM 116 determines a hazard is present in the path of the vehicle, it broadcasts an alert to notify the ROC 114. In addition to simply indicating the existence of a hazard, the alert may also specify the shape and position of the hazard (e.g., its polygon), a measure of confidence in its existence, a description of the sensors 118 that detected the hazard, and any other information that may help a human operator assess the validity of the report. In return, the ROC 114 may send an 'ignore obstacle' command back to the HDM 116 (as described further below).

Figure 2B:
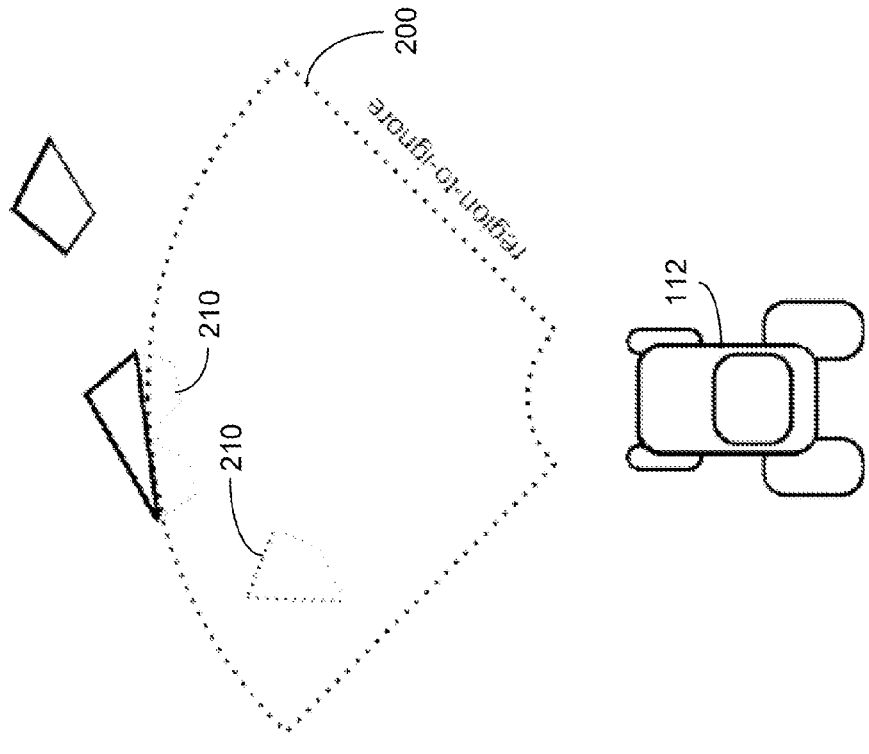
FIGS. 2A and 2B are simplified diagrams illustrating the process of applying a region-to-ignore to detected hazards in accordance with one or more embodiments.
Figure 2A:
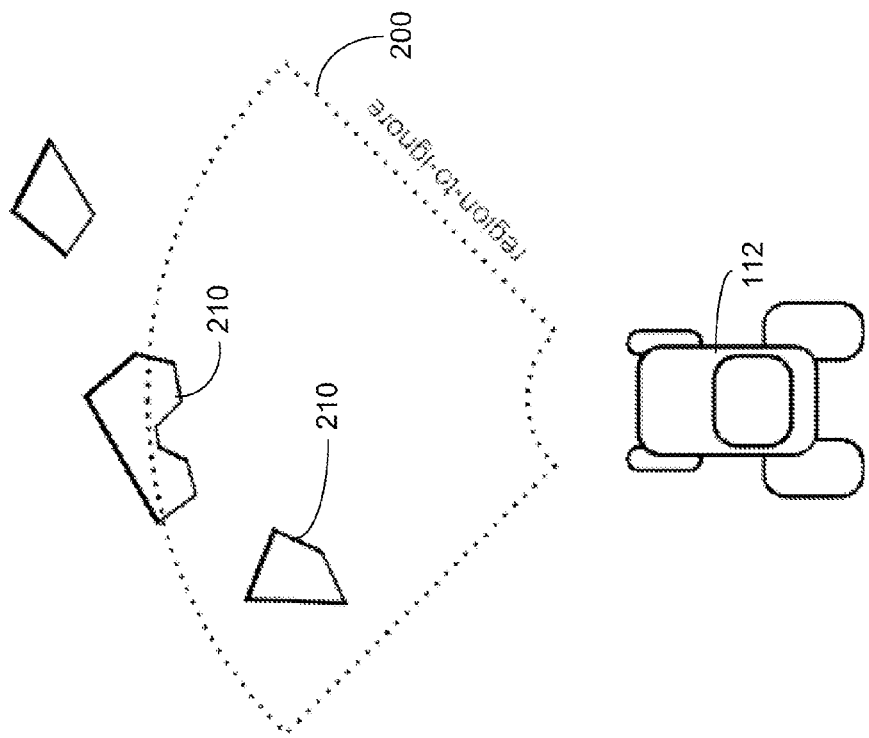

If the HDM 116 receives an 'ignore obstacle' command from the ROC 114, it does the following:

1. It constructs and records an 'absolute region-to-ignore' 200 as shown in FIG. 2A. This region is represented as a polygon in which each vertex denotes a fixed position on the earth. (The construction of this polygon is discussed further below.)
2. A timer is started. When the timer has reached a predetermined deadline, an 'ignore obstacle' command received from the ROC 114 is considered complete and the 'absolute region-to-ignore' is cleared.
3. While the HDM 116 has an active 'absolute region-to-ignore' 200, computed hazards 210 (or portions thereof) that lie within that region are ignored and discarded by the HDM 116. In one or more embodiments, this is accomplished by discarding all vertices of a hazard polygon that lie within the 'absolute region-to-ignore' 200 as shown in FIG. 2B. Alternately, the system can compute the geometric subtraction of the area contained by the hazard polygon from the area in the 'absolute region-to-ignore.'

By way of example, the duration of the 'ignore obstacle' command (i.e., the deadline of the timer) is 20 seconds.

The ROC 114 receives status alerts from the VC 110. In one exemplary embodiment, the ROC 114 periodically polls the VC 110 to request its current alert state.

Figure 3:
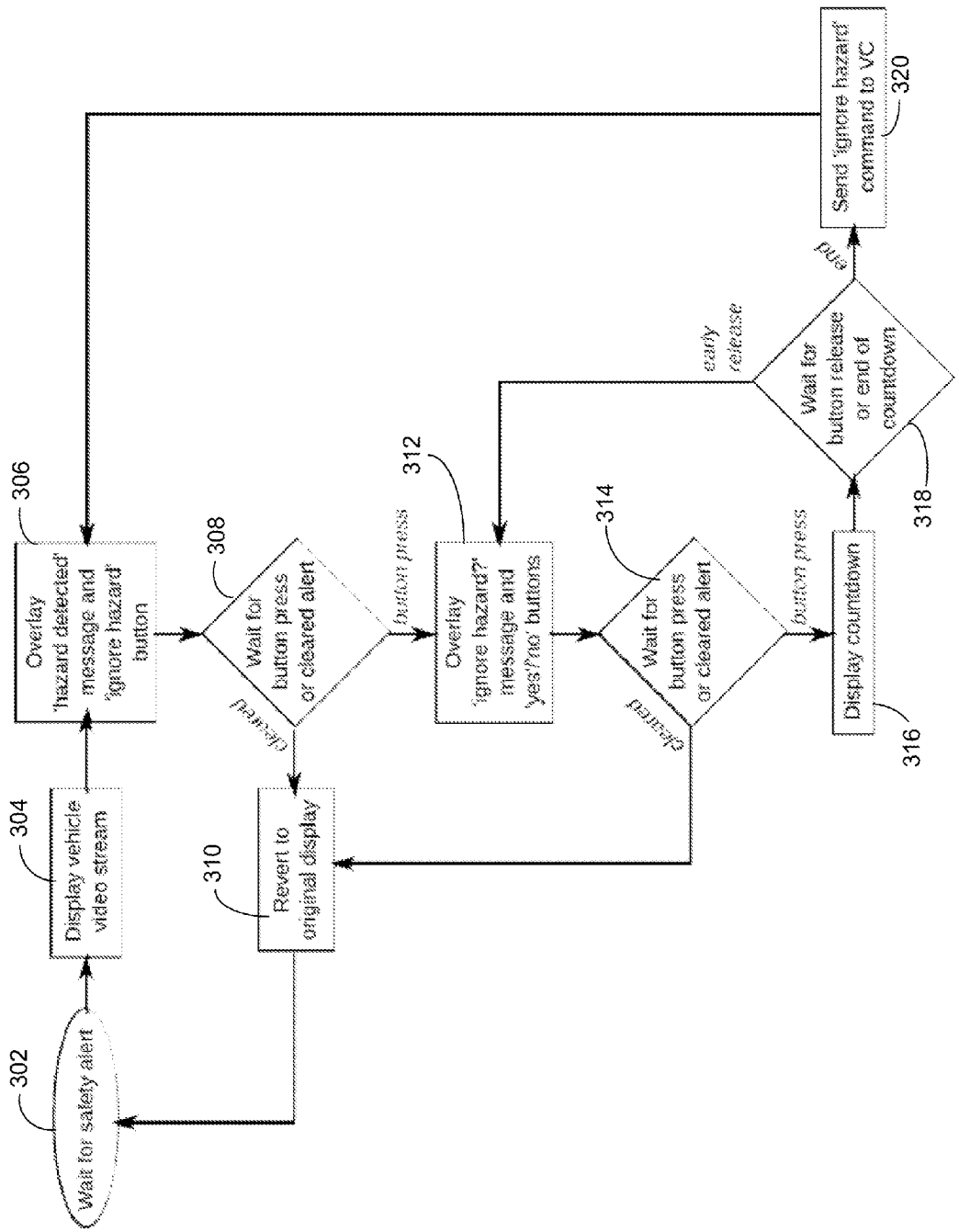
FIG. 3 is a flowchart illustrating the process of handling a received safety alert in accordance with one or more embodiments.

FIG. 3 is a flowchart illustrating exemplary operation of the ROC 114 in accordance with one or more embodiments.

The ROC 114 waits to receive alerts from the VC 110 at 302. When the ROC 114 receives a safety alert from the VC 110 indicating that the vehicle has detected a hazard in the path of the vehicle, it will display a video stream at 304 to the ROC operator from a camera 122 on the vehicle oriented toward the hazard.

The ROC 114 also overlays a message indicating that a hazard has been detected at 306, and presents a button giving the operator the option to ignore that hazard. The ROC 114 can also draw the hazard's computed polygon as an overlay on the video image, and can display any additional information from the hazard alert, such as a computed confidence measure or an indication of which sensors 118 detected the hazard.

The ROC 114 then waits for the operator to press the button at 308, while continuing to monitor the state of the safety alert. If the VC 110 happens to clear the safety alert without operator intervention (e.g., a detected vehicle subsequently moves out of the way), then the ROC 114 removes the hazard message and returns to its previous display state at 310.

If the operator presses the 'ignore hazard' button, then the ROC 114 switches to a 'Ignore Hazard' mode in which:

1. it continues to display video from the same camera; and
2. it presents a message to indicate the new mode, an affirmative query such as "Ignore hazard?" or "Continue driving?", and two buttons labeled 'no' and 'yes' at 312.

The ROC 114 then waits for the operator to press a button at 314, while continuing to monitor the state of the safety alert. As before, if the VC 110 clears the safety alert without operator intervention, then the ROC 114 removes the message and buttons and returns to its display state prior to the alert at 310.

If the operator presses the 'no' button at 314, then the ROC 114 returns to the 'hazard detected' display state 306 described previously.

If the operator presses the 'yes' button, the ROC 114 displays a countdown at 316 and requires the operator to keep the 'yes' button depressed for a short duration to confirm the operator's intent at 318. By way of example, this duration can be five seconds. If the button is kept pressed beyond the timeout, then the 'yes' press is accepted and the ROC 114 sends an "ignore obstacle" command to the VC 110 at 320. The ROC display returns to the 'hazard detected' state and monitors the safety alert status from the VC 110, expecting it soon to be cleared.

A number of different strategies may be used in the VC 110 to calculate the region-to-ignore. The choice of strategy affects the desired semantics of the 'ignore hazard' action offered to the operator.

The region-to-ignore may be generated as a polygon of fixed shape and scale corresponding to the field of view of the video camera oriented toward the hazard 210 (i.e., the camera chosen for the ROC video display of the hazard). In one exemplary embodiment, this shape 400 is an arc of an annulus located in front of the vehicle, typically 90 degrees of arc with a near radius of 5 meters and far radius of 30 meters as shown in FIG. 4A. When the region-to-ignore is generated using this strategy, the 'ignore hazard' action corresponds to the notion of "ignore any hazard currently visible from this camera."

The region-to-ignore may also be generated with a shape and scale 402 corresponding to the hazard 210 itself. One option is to use a fixed simple shape (e.g., a disc, hexagon, octagon), which is positioned over the hazard and scaled to (over)cover the hazard as shown in FIG. 4B. Another option is to use the polygon 404 of the detected hazard itself, in which case the hazard polygon is outset by a small distance to ensure that the region-to-ignore covers a reasonable amount of variation in the detected shape over time due to imperfect sensing as shown in FIG. 4C. When these strategies are used to generate the region-to-ignore, the 'ignore hazard' action corresponds to the notion of "ignore this specific detected hazard."

If the polygon is initially generated relative to the vehicle itself (in a reference frame fixed to the vehicle), then it is transformed into absolute geographic coordinates (in a reference frame fixed to the earth) using the current absolute geographic position and orientation of the vehicle provided by the VC navigation module.

In the particular exemplary embodiments disclosed herein, the vehicle is a driverless, autonomous vehicle that is assigned to execute tasks by an operator stationed at a remote console. It should be understood, however, that the methods and systems disclosed herein are equally applicable to implementations where the operator (and his or her console) are located in the vehicle. In this case, the console may be tethered to the vehicle.

The processes of the system described above may be implemented in software, hardware, firmware, or any combination thereof. The processes are preferably implemented in one or more computer programs executing on programmable computer systems for the VC and ROC, each including a processor, a storage medium readable by the processor (including, e.g., volatile and non-volatile memory and/or storage elements), and input and output devices. Each computer program can be a set of instructions (program code) in a code module resident in the random access memory of the computer systems. Until required by the computer systems, the set of instructions may be stored in another computer memory (e.g., in a hard disk drive, or in a removable memory such as an optical disk, external hard drive, memory card, or flash drive) or stored on another computer system and downloaded via the Internet or other network.

Having thus described several illustrative embodiments, it is to be appreciated that various alterations, modifications, and improvements will readily occur to those skilled in the art. Such alterations, modifications, and improvements are intended to form a part of this disclosure, and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments.

Accordingly, the foregoing description and attached drawings are by way of example only, and are not intended to be limiting.

What is claimed is:

1. A computer-implemented method for controlling operation of an autonomous driverless vehicle in response to detection of a hazard in a path of the vehicle, the method performed by a vehicle control system in the vehicle comprising the steps of:
   (a) detecting presence of a hazard in the path of the vehicle using an obstacle detection system in the vehicle;
   (b) transmitting a hazard alert message to a computer system operated by a human operator; and
   (c) receiving a command from the computer system operated by the human operator responsive to the hazard alert message, and operating the vehicle in accordance with said command, wherein the command comprises a command to ignore the hazard detected in (a) upon determination by the operator of a false positive event.

2. The method of claim 1, wherein the computer system operated by the human operator is located remotely from the vehicle, and wherein the hazard alert message and the command are transmitted over a wireless network.

3. The method of claim 1, wherein the computer system operated by the human operator is located within the vehicle.

4. The method of claim 1, further comprising receiving location information from a location detection system in the vehicle, and determining the position of the hazard based on the location information.

5. The method of claim 1, wherein the hazard alert message includes information on a shape of the hazard, a location of the hazard, or a measure of confidence in detection of the hazard.

6. The method of claim 1, wherein operating the vehicle in accordance with said command comprises:
   determining a given region-to-ignore comprising an area in the path of the vehicle containing at least a portion of the detected hazard;
   after a given period of time, clearing the region-to-ignore of the detected hazard; and
   ignoring any hazard, or portion thereof, detected within the region-to-ignore.

7. The method of claim 6, wherein determining the region-to-ignore comprises generating a polygon of a fixed shape and scale corresponding to a field of view of the obstacle detection system in the vehicle.

8. The method of claim 6, wherein determining the region-to-ignore comprises generating a polygon that covers the detected hazard.

9. The method of claim 6, wherein determining the region-to-ignore comprises generating a polygon having the general shape of the hazard, wherein the polygon is outset from the hazard by given distance.

10. The method of claim 1, further comprising, prior to step (c), transmitting an image or video stream captured by a camera on or in the vehicle of an area in which the hazard was detected to the computer system operated by the human operator.

11. A computer system in an autonomous driverless vehicle, comprising:
   at least one processor;
   memory associated with the at least one processor; and
   a program supported in the memory for controlling operation of the vehicle in response to detection of a hazard in a path of the vehicle, the program having a plurality of instructions stored therein which, when executed by the at least one processor, cause the at least one processor to:
   (a) detect the presence of a hazard in the path of the vehicle using an obstacle detection system in the vehicle;
   (b) transmit a hazard alert message to a computer system operated by a human operator; and
   (c) receive a command from the computer system operated by the human operator responsive to the hazard alert message, and operate the vehicle in accordance with said command, wherein the command comprises a command to ignore the hazard detected in (a) upon determination by the operator of a false positive event.

12. The system of claim 11, wherein the computer system operated by the human operator is located remotely from the vehicle, and wherein the hazard alert message and the command are transmitted over a wireless network.

13. The system of claim 11, wherein the computer system operated by the human operator is located within the vehicle.

14. The system of claim 11, wherein the program further comprises instructions for receiving location information from a location detection system in the vehicle, and determining the position of the hazard based on the location information.

15. The system of claim 11, wherein the hazard alert message includes information on a shape of the hazard, a location of the hazard, or a measure of confidence in detection of the hazard.

16. The system of claim 11, wherein instructions to operate the vehicle in accordance with said command comprises instructions for:
   determining a given region-to-ignore comprising an area in the path of the vehicle containing at least a portion of the detected hazard;
   after a given period of time, clearing the region-to-ignore of the detected hazard; and
   ignoring any hazard, or portion thereof, detected within the region-to-ignore.

17. The system of claim 16, wherein instructions for determining the region-to-ignore comprises instructions for generating a polygon of a fixed shape and scale corresponding to a field of view of the obstacle detection system in the vehicle.

18. The system of claim 16, wherein instructions for determining the region-to-ignore comprises instructions for generating a polygon that covers the detected hazard.

19. The system of claim 16, wherein instructions for determining the region-to-ignore comprises instructions for generating a polygon having the general shape of the hazard, wherein the polygon is outset from the hazard by given distance.

20. The system of claim 11, the program further comprises instructions for, prior to step (c), transmitting an image or video stream captured by a camera on or in the vehicle of an area in which the hazard was detected to the computer system operated by the human operator.

21. A system for controlling operation of an autonomous driverless vehicle in response to detection of a hazard in a path of the vehicle, comprising:
   a computer system operated by a human operator; and
   a vehicle controller located in the autonomous driverless vehicle, said vehicle controller programmed to
   (a) detect the presence of a hazard in the path of the vehicle using an obstacle detection system in the vehicle;
   (b) transmit a hazard alert message to the computer system operated by a human operator; and
   (c) receive a command from the computer system operated by the human operator responsive to the hazard alert message, and operate the vehicle in accordance with said command, wherein the command comprises a command to ignore the hazard detected in (a) upon determination by the operator of a false positive event.

22. The system of claim 21, wherein the computer system operated by the human operator is located remotely from the vehicle, and wherein the hazard alert message and the command are transmitted over a wireless network.

23. The system of claim 21, wherein the computer system operated by the human operator is located within the vehicle.

24. The system of claim 21, wherein the vehicle controller is programmed to receive location information from a location detection system in the vehicle, and determine the position of the hazard based on the location information.

25. The system of claim 21, wherein the hazard alert message includes information on a shape of the hazard, a location of the hazard, or a measure of confidence in detection of the hazard.

26. The system of claim 21, wherein the vehicle controller is programmed to:
   determine a given region-to-ignore comprising an area in the path of the vehicle containing at least a portion of the detected hazard;
   after a given period of time, clear the region-to-ignore of the detected hazard; and
   ignore any hazard, or portion thereof, detected within the region-to-ignore.

27. The system of claim 26, wherein the vehicle controller is programmed to determine the region-to-ignore by generating a polygon of a fixed shape and scale corresponding to a field of view of the obstacle detection system in the vehicle.

28. The system of claim 26, wherein vehicle controller is programmed to determine the region-to-ignore by generating a polygon that covers the detected hazard.

29. The system of claim 26, wherein vehicle controller is programmed to determine the region-to-ignore by generating a polygon having the general shape of the hazard, wherein the polygon is outset from the hazard by given distance.

30. The system of claim 21, wherein vehicle controller is programmed to, prior to step (c), transmit an image or video stream captured by a camera on or in the vehicle of an area in which the hazard was detected to the computer system operated by the human operator.

* * * * *